United States Patent
Tanaka et al.

[11] Patent Number: 6,028,654
[45] Date of Patent: Feb. 22, 2000

[54] LIQUID CRYSTAL DISPLAY WITH ELECTRODE STRUCTURE HAVING SMALL AND HIGH SURFACE RESISTIVITY ELECTRODES PREVENTING ACCUMULATION OF STATIC ELECTRICITY ON ELECTRODE SEGMENTS

[75] Inventors: Osamu Tanaka; Yukito Toriumi, both of Kyoto, Japan

[73] Assignee: Rohm Co., Ltd., Kyoto, Japan

[21] Appl. No.: 08/165,513

[22] Filed: Dec. 10, 1993

Related U.S. Application Data

[63] Continuation of application No. 07/993,090, Dec. 18, 1992, abandoned.

[30] Foreign Application Priority Data

Dec. 27, 1991 [JP] Japan .................................... 3-360058

[51] Int. Cl.$^7$ .................. G02F 1/1343; G02F 1/1333
[52] U.S. Cl. ..................... 349/147; 349/138; 349/143
[58] Field of Search ..................... 359/79, 87, 74; 349/138, 139, 143, 146, 147, 148

[56] References Cited

U.S. PATENT DOCUMENTS

| | | | |
|---|---|---|---|
| 3,938,879 | 2/1976 | Dalmasso | 359/79 |
| 4,718,751 | 1/1988 | Kamijo et al. | 359/87 |
| 4,789,857 | 12/1988 | Maurice | 340/784 |
| 4,932,757 | 6/1990 | Hanyu et al. | 359/79 |
| 5,105,291 | 4/1992 | Matsumoto et al. | 359/87 |

FOREIGN PATENT DOCUMENTS

| | | | |
|---|---|---|---|
| 57-168228 | 10/1982 | Japan | 359/79 |
| 358145918A | 8/1983 | Japan . | |
| 61-239214 | 10/1986 | Japan | 359/87 |
| 63-18329 | 1/1988 | Japan | 359/87 |
| 63-65423 | 3/1988 | Japan | 359/79 |
| 3208021 | 9/1991 | Japan | 359/87 |
| 404037714A | 2/1992 | Japan . | |

*Primary Examiner*—Kenneth Parker
*Assistant Examiner*—Tarifur R. Chaudhury
*Attorney, Agent, or Firm*—Baker & Botts, L.L.P.

[57] ABSTRACT

ITO transparent electrodes having a low surface resistivity of 20–70 $\Omega/\Box$ are formed on a glass substrate. An additional ITO transparent electrode having a high surface resistivity of about 1 M$\Omega/\Box$ is formed so as to cover the low-resistivity transparent electrodes. Locally generated high-voltage static electricity is distributed in the high-resistivity transparent electrode, to prevent a spark between adjacent low-resistivity electrodes.

5 Claims, 2 Drawing Sheets

LIQUID CRYSTAL DISPLAY WITH ELECTRODE STRUCTURE HAVING SMALL AND HIGH SURFACE RESISTIVITY ELECTRODES PREVENTING ACCUMULATION OF STATIC ELECTRICITY ON ELECTRODE SEGMENTS

This application is a continuation of application Ser. No. 07/993,090, filed on Dec. 18, 1992, now abandoned.

BACKGROUND OF THE INVENTION

The present invention relates to a liquid crystal display panel and, more specifically, to its electrode structure.

FIG. 2 is a sectional view of a conventional liquid crystal display panel, in which a liquid crystal layer is drawn with exaggeration. The liquid crystal display panel is constituted such that a liquid crystal 12 is sealed between glass substrates 10 and 11, and polarizing plates 13, 14 are disposed outside the respective glass substrates 10, 11. Reference numerals 15 and 16 represent adhesives for sealing the liquid crystal 12, and numeral 17 represents transparent electrodes made of, e.g., an ITO (indium tin oxide) film and formed on the glass substrate 11.

FIG. 3(a) is a sectional view and FIG. 3(b) is a plan view showing only the glass substrate 11 and the transparent electrodes 17 of FIG. 2. A plurality of transparent electrodes (ITO films) 17 are arranged on the glass substrate 11, and usually have a surface resistivity of 20–70 $\Omega/\square$.

In assembling the liquid crystal display panel, it sometimes occurs that a rubbing operation in the rubbing process of the glass substrate 11 causes static electricity. In the case of the electrode structure as described above, in the worst case, sparking due to static electricity build-up causes destruction of the transparent electrodes (ITO films) 17 at their closely adjacent portions where a pattern pitch is 5–20 $\mu$m, resulting in a deterioration of the display performance of the liquid crystal display panel.

SUMMARY OF THE INVENTION

An object of the present invention is to provide an electrode structure of a liquid crystal display panel which can prevent the destruction of transparent electrodes due to static electricity build-up.

According to the invention, in a liquid crystal display panel having an electrode structure on a substrate, the electrode structure comprises:

a first electrode pattern comprising an array of electrode segments formed on the substrate and having a small resistivity; and a second electrode pattern having a high resistivity, and formed on the substrate so as to cover at least part of the electrode segments.

With the above constitution, the static electricity, which may otherwise destruct the low-resistivity electrode pattern of the liquid crystal display panel, is distributed in the high-resistivity electrode pattern and no spark occurs, so that a deterioration of the display performance can be avoided.

DESCRIPTION OF THE PREFERRED EMBODIMENTS

An embodiment of the present invention is described below with reference to the accompanying drawings.

Figure 1A:
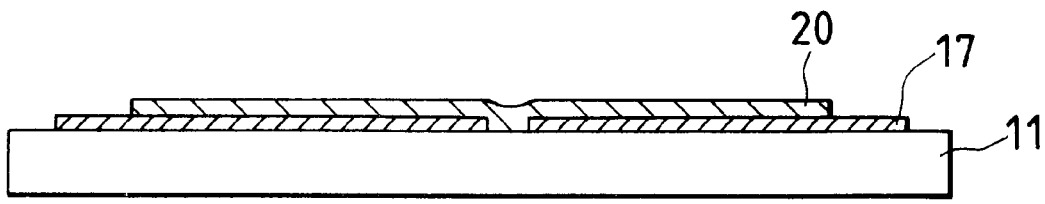
FIG. 1(a) is a sectional view and FIG. 1(b) is a plan view showing a structure of transparent electrodes of a liquid crystal display panel according to an embodiment of the present invention.
Figure 1B:
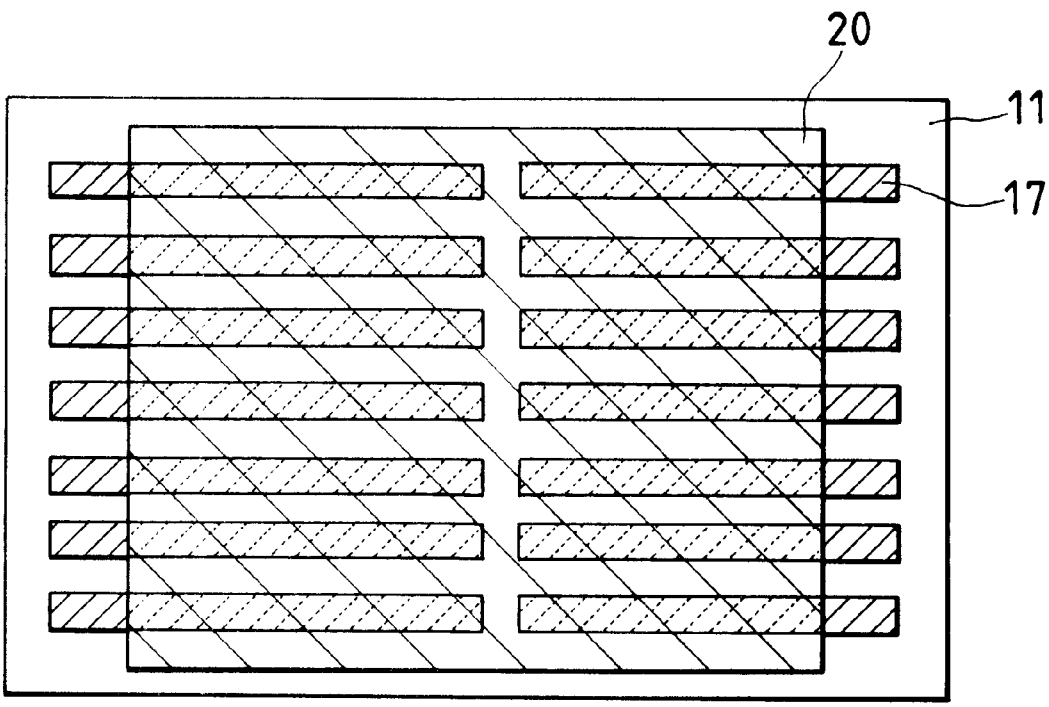

FIG. 1(a) is a sectional view and FIG. 1(b) is a plan view showing a structure of transparent electrodes of a liquid crystal display panel according to an embodiment of the invention.

As in the case of the conventional liquid crystal display panel, transparent electrodes (ITO films) 17 for display control are formed on the glass substrate 11 so as to have a surface resistivity of 20–70 $\Omega/\square$. Another electrode (ITO film) 20 is formed so as to partially cover the electrodes 17 and to have a surface resistivity of 1 $M\Omega/\square$.

Figure 2:
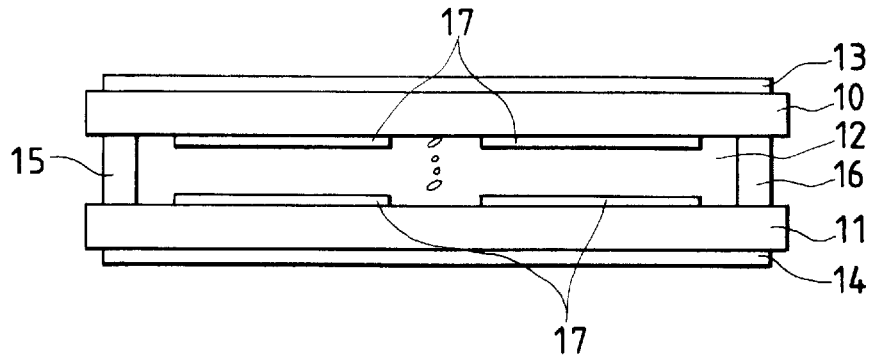
FIG. 2 is a sectional view of a conventional liquid crystal display panel.
Figure 3A:
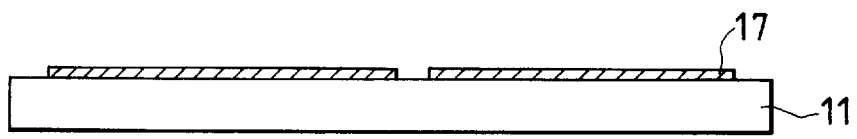
FIG. 3(a) is a sectional view and FIG. 3(b) is a plan view showing a structure of transparent electrodes of the conventional liquid crystal display panel of FIG. 2.
Figure 3B:
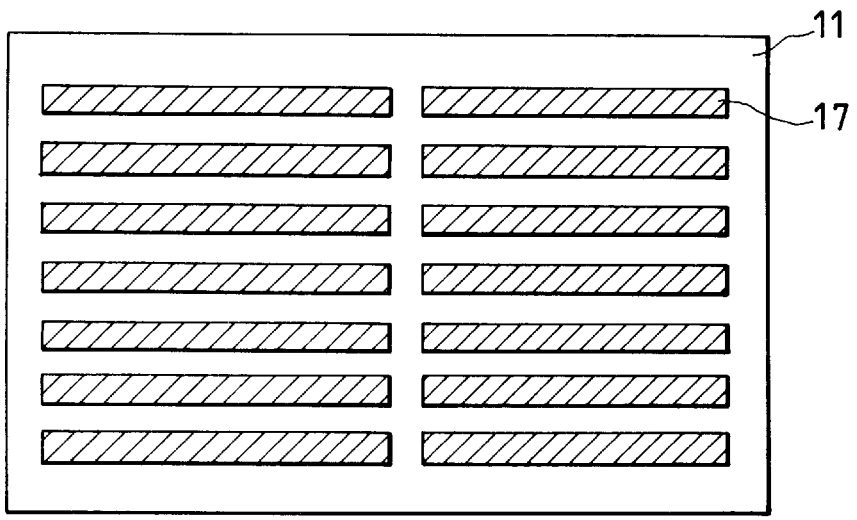

In general, operating with a threshold voltage of about 3–6 V, liquid crystal materials do not transmit light when they are given a voltage below the threshold voltage. If it is assumed that the liquid crystal material has a resistivity of about $8 \times 10^{10}$ $\Omega$cm, the liquid crystal layer 12 (see FIG. 2) has a thickness of 5 $\mu$m, and an application voltage is 5 V, only a very small current of about $1.25 \times 10^{-8}$ A flows through the liquid crystal layer 12.

In usual operations, where only a very small current flows through the liquid crystal layer 12, the voltage developed across the electrode (ITO film) 20 having the surface resistivity of 1 $M\Omega/\square$ is very small and the threshold voltage of the liquid crystal 12 is not established. As a result, the portions of the liquid crystal layer 12 above the electrode 20 excluding the portions covering the electrodes 17 do not transmit light and, therefore, the electrode 20 does not influence the display performance.

On the other hand, when static electricity of several tens of thousands volts to several hundred thousand volts is locally applied to the electrodes, a resultant current passes the pattern of the electrode 20, so that the occurrence of a spark can be prevented.

It is noted that the invention can also be applied to other devices, such as a touch panel, that employ an ITO film.

As described above, according to the invention, a high voltage due to static electricity, which may occur, for instance, in assembling the liquid crystal display panel, is distributed in the additional high-resistivity electrode pattern, i.e., does not concentrate on a small portion of the low-resistivity electrode pattern. Therefore, no spark occurs in the low-resistivity electrode pattern, and there can be prevented the destruction of the low-resistivity electrode pattern by static electricity build-up and the resultant deterioration of the display performance of the liquid display crystal display panel.

What is claimed is:

1. A liquid crystal display panel having an electrode structure on a substrate, said electrode structure comprising:

a first electrode pattern comprising an array of electrode segments formed on the substrate and having a small surface resistivity; and a thin film layer of electrode material having a high surface resistivity formed on the substrate and extending over a central portion of the array of electrode segments so as to cover at least part of each of the electrode segments, the thin film layer of electrode material having sufficient surface conductivity to distribute static electricity over the area of the array to prevent localized accumulation of static electricity on the electrode segments.

2. The liquid crystal display panel of claim 1, wherein the first electrode pattern and the thin film layer of electrode material are transparent.

3. A liquid crystal display panel having an electrode structure on a substrate, said electrode structure comprising:

a first electrode pattern comprising an array of electrode segments formed on the substrate and having a small surface resistivity; and a thin film layer of electrode material having a high surface resistivity formed on the substrate and extending over a central portion of the array of electrode segments so as to cover at least part of each of the electrode segments, the thin film layer of electrode material having sufficient surface conductivity to distribute static electricity over the area of the array to prevent localized accumulation of static electricity on the electrode segments, wherein the first electrode pattern and the thin film layer of electrode material are transparent ITO films.

4. The liquid crystal display panel of claim 1, wherein the thin film layer of electrode material is a single electrode layer partially covering each of the electrode segments of the first electrode pattern.

5. The liquid crystal display panel of claim 1, wherein the first electrode pattern has a surface resistivity within a range of 20–70 $\Omega/\square$, and the thin film layer of electrode material has a surface resistivity of about 1 M$\Omega/\square$.

\* \* \* \* \*